C. B. KLINE.
LAYING DRAIN-TILES.

No. 188,149. Patented March 6, 1877.

Witnesses:—
Frank P. Davis
C. T. Havenner

Inventor:
Chas. Beehee Kline
by C. F. Rowe
his Attorney.

UNITED STATES PATENT OFFICE.

CHARLES BEEHEE KLINE, OF DODGEVILLE, IOWA.

IMPROVEMENT IN LAYING DRAIN-TILES.

Specification forming part of Letters Patent No. 188,149, dated March 6, 1877; application filed August 31, 1876.

*To all whom it may concern:*

Be it known that I, CHARLES BEEHEE KLINE, of Dodgeville, in the county of Des Moines, State of Iowa, have invented a certain new and useful Improvement in the Art of Laying Tile Draining-Pipes, of which the following is a specification:

The object of my invention is to lay rapidly, without breakage, and with convenience, strings of tile draining-pipes, in such a manner as to form a perfect joint between the sections of tile, and at the same time to allow the tile to follow the course of the furrow.

Figure 1:
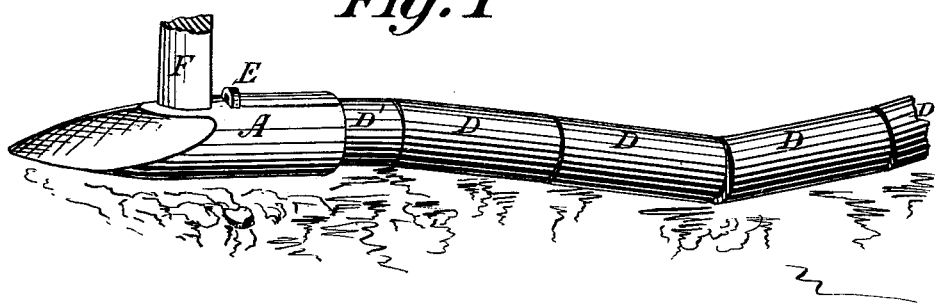
Figure 2:
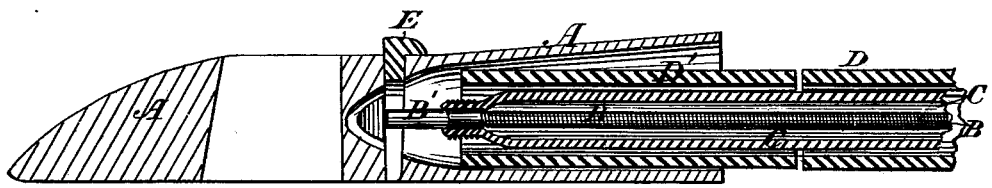
Figure 3:
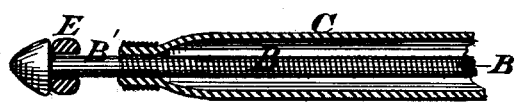

In the accompanying drawings, Figure 1 represents a perspective view of a portion of a tile draining-plow with sections of tiles attached; Fig. 2, a longitudinal section of the same; Fig. 3, a horizontal section through the cable, and a rubber tubing attached, as hereinafter described; and Fig. 4, an elevation of a pin for connecting the cable with the mold.

A mold, A, is preferably formed, as shown in Fig. 2, with straight lower surface, and with its rear portion A' made tubular or hollow, to receive one end of the cable B and its connections. A rod, B', is attached to the end of the cable B, for connecting it with the mold, as hereinafter described; and a tube, C, made of rubber or other suitable flexible material, envelops, and is connected with, the cable, and is of sufficient diameter to nearly fill the interior of the tile sections D D', so that they may be held in line one with the other, but with sufficient play to enable the tubing, with its cable, to be withdrawn from the tiles, when desired, without displacing them. The rod B' is connected with the mold by a through-bolt, E, which can be readily withdrawn therefrom when it is desired to attach a new string of tiles to the cable.

The mold can be attached to the beam of the plow by means of the colter F, or, as may be desired, in any well-known way.

The rear portion A' of the mold is made flaring, so as to give sufficient play to the first section of the tile which passes into it, and which is protected thereby from falling dirt or stone.

It will be seen that while the rubber tubing fills the interior of the tiles sufficiently to keep them in line, it will permit the string of tiles to follow the course of the furrow and the undulations of the ground.

Figure 4:

The rod B' has a head preferably formed as shown in the drawings, to conform to the shape of the inner surface of the rear portion of the mold, by which means the rod, when in place, will be in a central line with the mold, and the through-bolt or key E may be U-shaped, as shown in Fig. 4, so as to straddle the rod, and permit of its easy and secure attachment to the mold.

The rear end of the cable may be provided with a suitable head and washer, to hold the tile sections upon the tubing while being laid.

I claim as my invention, and desire to secure by Letters Patent—

The combination, with a drain-plow, of a rope or cable and rubber tubing for laying tiles, substantially as described.

CHARLES BEEHEE KLINE.

Witnesses:
JAMES HOWARD BREMMERMAN,
L. M. MILLER.